(12) United States Patent
Sakano et al.

(10) Patent No.: US 11,081,706 B2
(45) Date of Patent: Aug. 3, 2021

(54) FUEL CELL STACK

(71) Applicant: HONDA MOTOR CO., LTD., Tokyo (JP)

(72) Inventors: Masaaki Sakano, Wako (JP); Hiroshi Morikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 15/986,126

(22) Filed: May 22, 2018

(65) Prior Publication Data
US 2018/0342741 A1 Nov. 29, 2018

(30) Foreign Application Priority Data

May 25, 2017 (JP) .............................. JP2017-103584

(51) Int. Cl.
| | |
|---|---|
| *H01M 8/2465* | (2016.01) |
| *H01M 8/24* | (2016.01) |
| *H01M 8/2483* | (2016.01) |
| *H01M 8/0258* | (2016.01) |
| *H01M 8/0273* | (2016.01) |
| *H01M 8/1007* | (2016.01) |
| *H01M 8/1004* | (2016.01) |
| *H01M 8/242* | (2016.01) |
| *H01M 8/04119* | (2016.01) |
| *H01M 8/1018* | (2016.01) |
| *H01M 8/0284* | (2016.01) |

(52) U.S. Cl.
CPC ....... *H01M 8/0258* (2013.01); *H01M 8/0273* (2013.01); *H01M 8/04156* (2013.01); *H01M 8/1004* (2013.01); *H01M 8/1007* (2016.02); *H01M 8/242* (2013.01); *H01M 8/2465* (2013.01); *H01M 8/2483* (2016.02); *H01M 8/0284* (2013.01); *H01M 2008/1095* (2013.01)

(58) Field of Classification Search
None
See application file for complete search history.

(56) References Cited

U.S. PATENT DOCUMENTS

| | | | | |
|---|---|---|---|---|
| 2004/0229100 A1* | 11/2004 | Komura | ............... | H01M 8/0247 429/457 |
| 2008/0206622 A1* | 8/2008 | Mitsuta | ............... | H01M 8/0276 429/448 |

FOREIGN PATENT DOCUMENTS

JP 2005-251526 9/2005

OTHER PUBLICATIONS

German Office Action and Search Report for German Patent Application No. 102018208146.8 dated Mar. 14, 2019.

* cited by examiner

*Primary Examiner* — Yoshitoshi Takeuchi
(74) *Attorney, Agent, or Firm* — Amin, Turocy & Watson, LLP

(57) ABSTRACT

A fuel cell stack includes a stack body of power generation cells stacked in a horizontal direction. An oxygen-containing gas flow field is formed in the fuel cell stack, for allowing an oxygen-containing gas to flow along an electrode surface of a membrane electrode assembly. A plurality of oxygen-containing gas discharge passages for discharging the oxygen-containing gas as a reactant gas pass through the fuel cell stack in a stacking direction of the power generation cells. Each of the oxygen-containing gas discharge passages is connected to an outlet. The plurality of oxygen-containing gas discharge passages are connected together by a first connection channel at an end opposite to the outlet.

9 Claims, 7 Drawing Sheets

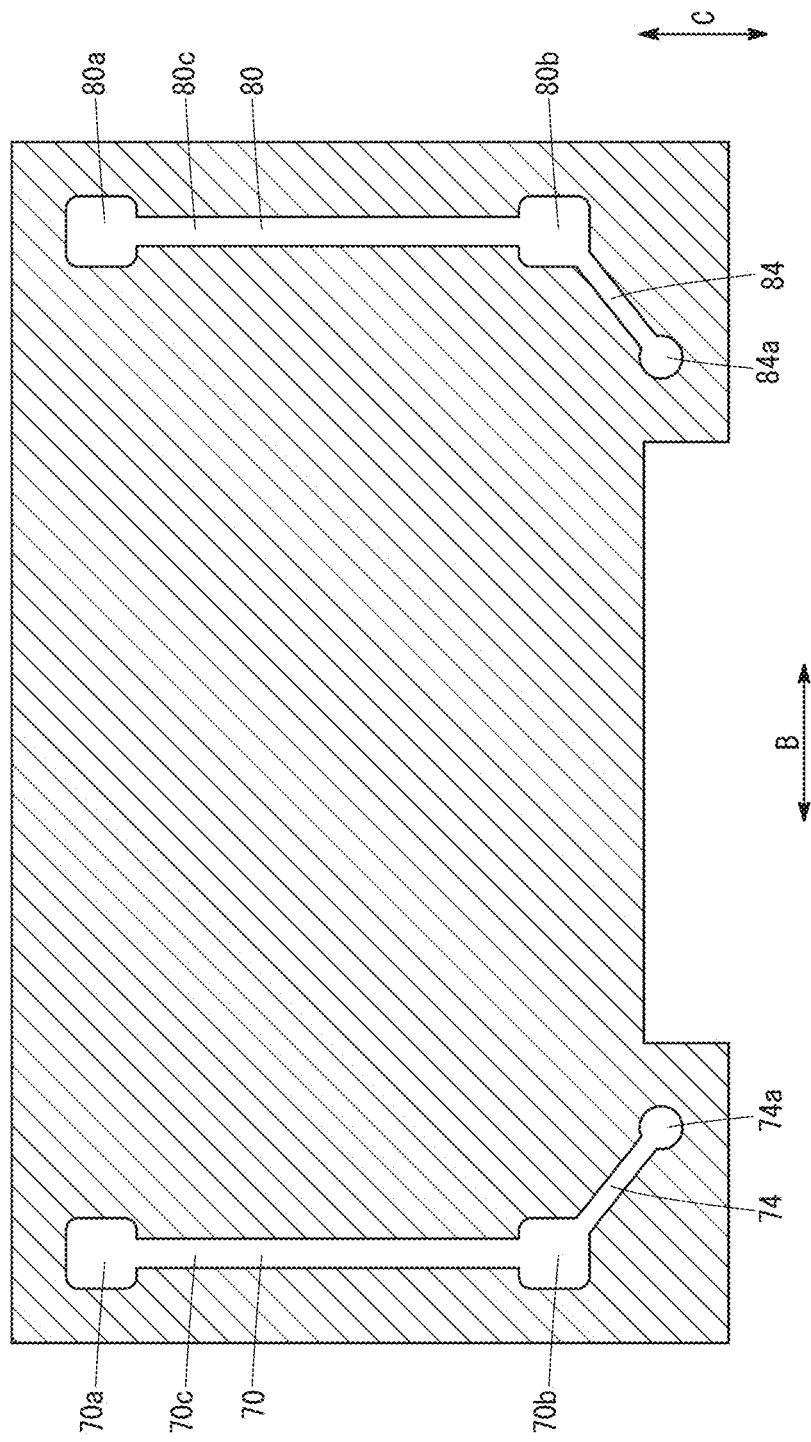

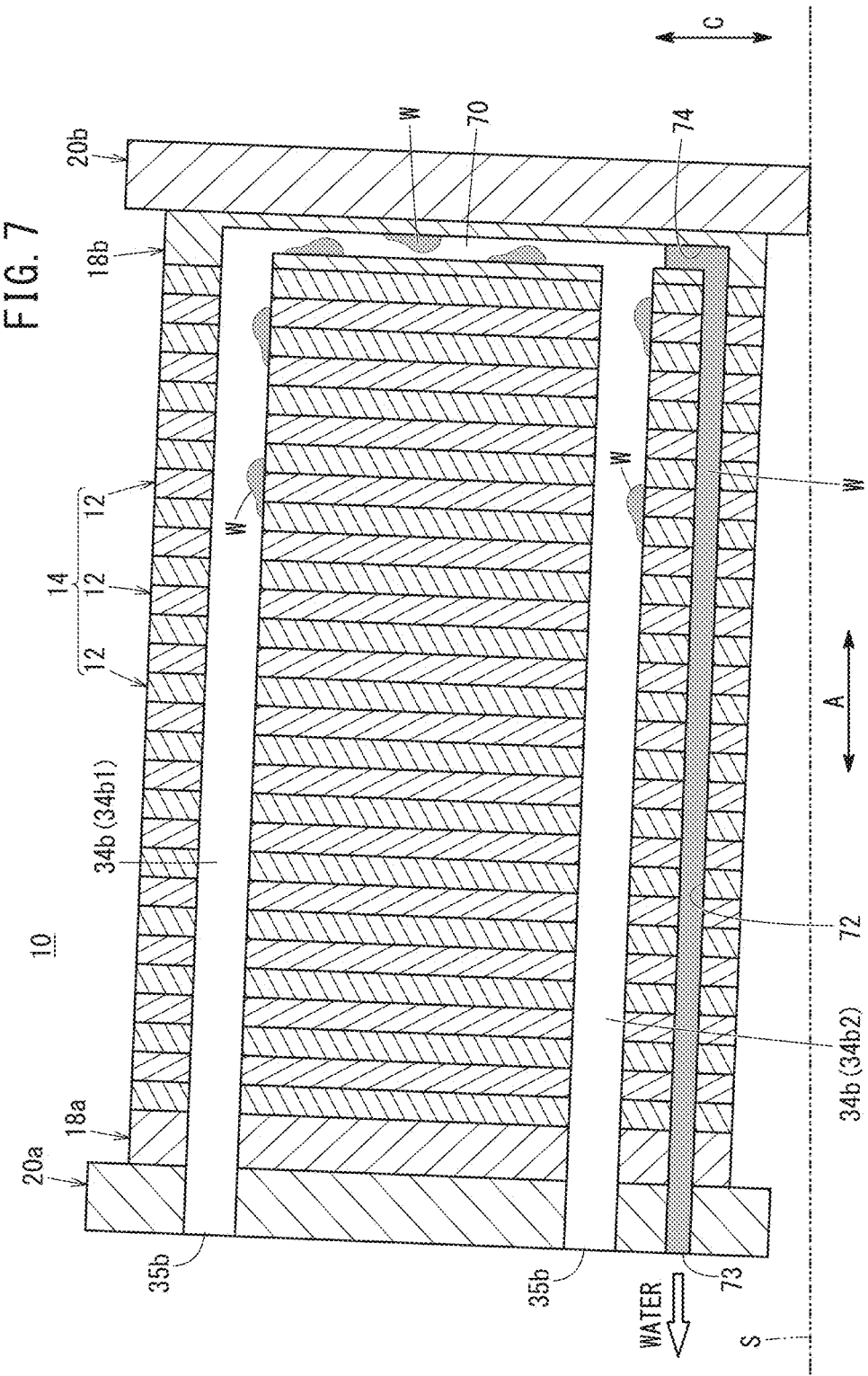

FUEL CELL STACK

CROSS-REFERENCE TO RELATED APPLICATION

This application is based upon and claims the benefit of priority from Japanese Patent Application No. 2017-103584 filed on May 25, 2017, the contents of which are incorporated herein by reference.

BACKGROUND OF THE INVENTION

Field of the Invention

The present invention relates to a fuel cell stack.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA). The membrane electrode assembly is formed by providing an anode on one surface of the solid polymer electrolyte membrane, and providing a cathode on the other surface of the solid polymer electrolyte membrane.

The membrane electrode assembly is sandwiched between separators (bipolar plates) to form a power generation cell (unit cell). A predetermined number of power generation cells are stacked together to form, e.g., an in-vehicle fuel cell stack mounted in a vehicle.

In the fuel cell stack, a fuel gas flow field is formed between the MEA and one of the separators, as one of reactant gas flow fields, and an oxygen-containing flow field is formed between the MEA and the other of the separators, as the other of the reactant gas flow fields. Further, a fuel gas supply passage for supplying a fuel gas to the fuel gas flow field, a fuel gas discharge passage for discharging the fuel gas from the fuel gas flow field, an oxygen-containing gas supply passage for supplying an oxygen-containing gas to the oxygen-containing gas flow field, and an oxygen-containing gas discharge passage for discharging the oxygen-containing gas from the oxygen-containing gas flow field extend through the fuel cell stack in the stacking direction. The fuel cell stack having such structure is disclosed in, e.g., Japanese Laid-Open Patent Publication No. 2005-251526.

SUMMARY OF THE INVENTION

In the conventional fuel cell stacks, one fuel gas discharge passage and one oxygen-containing gas discharge passage are provided, and outlets of these reactant gas discharge passages are connected to manifolds at one end in the direction in which the reactant gas discharge passages extend. In the structure, for example, in the case where a fuel cell stack mounted in a vehicle is tilted in a stacking direction, water produced in the fuel cell stack (produced water) is retained at a deep end of the reactant gas discharge passage (end opposite to the outlet). As a result, since the pressure loss in the power generation cell positioned at the end in the stacking direction (end cell) is increased, the reactant gas cannot enter the end cell easily. In the power generation cell having shortage of the reactant gases, concentration overpotential is increased, and the cell voltage is decreased. As a result, the power generation cannot be performed stably. Therefore, continuation of the power generation may become difficult. Further, since degradation of the electrolyte membranes, degradation of the electrode catalyst, and corrosion of the separators may occur due to the stagnant water retained in the cells, the product life of the fuel cell stack becomes short.

The present invention has been made taking the above problem into account, and an object of the present invention is to provide a fuel cell stack in which it is possible to suppress stagnation of produced water at a deep end of a reactant gas discharge passage when the fuel cell stack is tilted.

In order to achieve the above object, in the present invention, a fuel cell stack includes a stack body of a plurality of power generation cells stacked in a horizontal direction. Each of the power generation cells includes a membrane electrode assembly and a separator stacked on the membrane electrode assembly. The membrane electrode assembly includes an electrolyte membrane and electrodes provided on both sides of the electrolyte membrane. A reactant gas flow field is formed in the fuel cell stack and configured to allow a reactant gas to flow along an electrode surface. A plurality of reactant gas discharge passages are connected to the reactant gas flow field and configured to discharge the reactant gas and the reactant gas discharge passages pass through the fuel cell stack in a stacking direction of the power generation cells. Each of the plurality of reactant gas discharge passages has an outlet of the reactant gas, and the plurality of reactant gas discharge passages are connected together by a connection channel at ends opposite to the outlets.

Preferably, the fuel cell stack may include a drain configured to discharge produced water, the drain may pass through the fuel cell stack in the stacking direction, and the drain is connected to the connection channel.

Preferably, the connection channel may be provided in a terminal plate, an insulator, or an end plate positioned at an end of the stack body.

Preferably, the plurality of reactant gas discharge passages may include two reactant gas discharge passages having different heights, and the drain may be positioned below the reactant gas discharge passage positioned on a lower side.

Preferably, the fuel cell stack may include a relay channel inclined downward from a lower end of the connection channel, and the drain may be connected to the connection channel through the relay channel.

In the fuel cell stack of the present invention, a plurality of reactant gas discharge passages are formed, and the reactant gas discharge passages are connected together by a connection channel. Therefore, when the fuel cell stack is tilted, it is possible to reduce the quantity of produced water (stagnant water) retained at the deep end of the reactant gas discharge passage of the stack body or prevent the produced water (stagnant water) from being retained at the deep end of the reactant gas discharge passage of the stack body. In the structure, it is possible to improve the power generation stability of the fuel cell stack. Further, since the quantity of the stagnant water is reduced, or no stagnant water is produced, it is possible to extend the product life of at least any of the electrolyte membrane, electrode catalyst, and the separator.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a schematic cross sectional view taken along a line VI-VI in FIGS. 4 and 5; and FIG. 7 is a schematic cross sectional view illustrating an advantage of a fuel cell stack.

DESCRIPTION OF THE PREFERRED EMBODIMENTS

Hereinafter, a preferred embodiment of a fuel cell stack of the present invention will be described with reference to the accompanying drawings.

Figure 1:
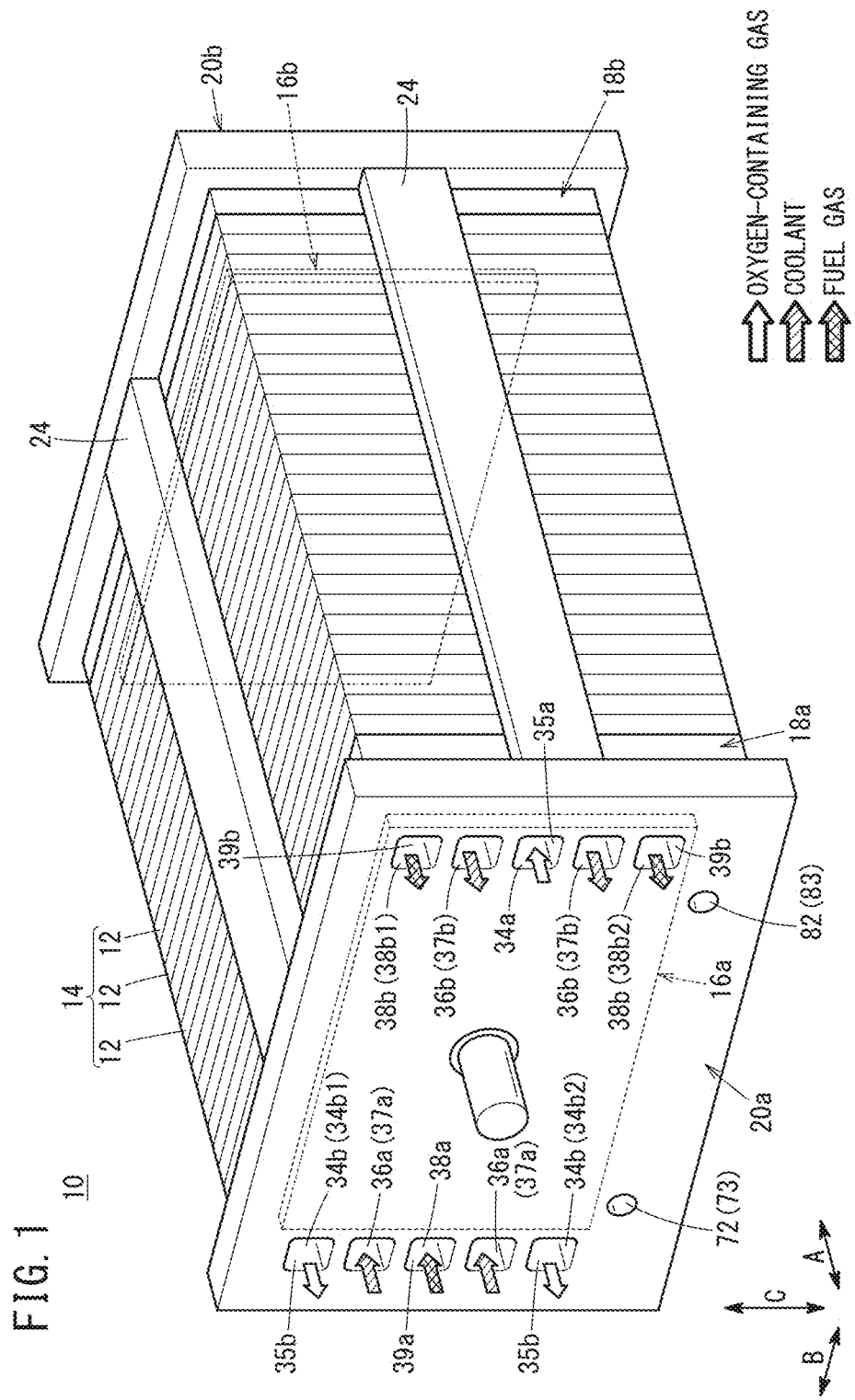
FIG. 1 is a perspective view showing a fuel cell stack according to an embodiment of the present invention.

As shown in FIG. 1, a fuel cell stack 10 according to the embodiment of the present invention includes a stack body 14 formed by stacking a plurality of power generation cells 12 in a horizontal direction indicated by an arrow A or in a gravity direction indicated by an arrow C. For example, the fuel cell stack 10 is mounted in a fuel cell vehicle such as a fuel cell electric automobile (not shown).

At one end of the stack body 14 in the stacking direction indicated by the arrow A, a terminal plate (power collection plate) 16a is provided. An insulator 18a is provided outside the terminal plate 16a, and an end plate 20a is provided outside the insulator 18a. At another end of the stack body 14 in the stacking direction, a terminal plate 16b is provided. An insulator 18b is provided outside the terminal plate 16b, and an end plate 20b is provided outside the insulator 18b. One of the insulators 18a, 18b, i.e., the insulator 18a is positioned between the stack body 14 and one of the end plates 20a, 20b, i.e., the end plate 20a. The other insulator 18b is positioned between the stack body 14 and the other end plate 20b. The insulators 18a, 18b are made of insulating material such as polycarbonate (PC) or phenol resin.

Each of the end plates 20a, 20b has a laterally elongated (or longitudinally elongated) rectangular shape. Coupling bars 24 are positioned between the sides of the end plates 20a, 20b. Both ends of the coupling bars 24 are fixed to inner surfaces of the end plates 20a, 20b to apply a tightening load to a plurality of stacked power generation cells 12 in the stacking direction indicated by the arrow A. It should be noted that the fuel cell stack 10 may have a casing including end plates 20a, 20b, and the stack body 14 may be placed in the casing.

Figure 2:
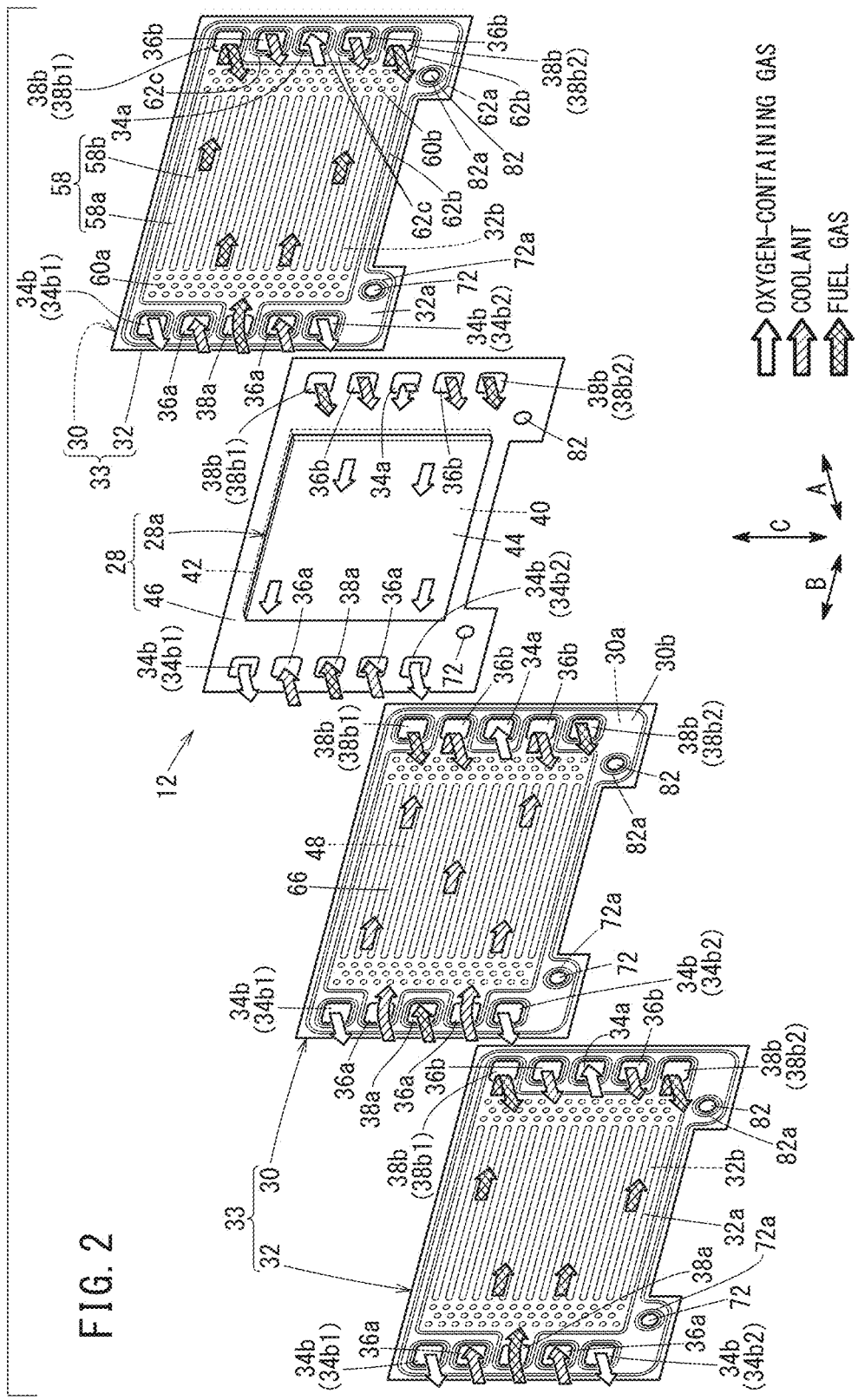
FIG. 2 is an exploded perspective view showing a power generation cell.

As shown in FIG. 2, in the power generation cell 12, a resin frame equipped MEA 28 is sandwiched between a first metal separator 30 and a second metal separator 32. Each of the first metal separator 30 and the second metal separator 32 is formed by press forming of a metal thin plate to have a corrugated shape in cross section. For example, the metal plate is a steel plate, a stainless steel plate, an aluminum plate, a plate steel plate, or a metal plate having an anti-corrosive surface by surface treatment. Outer ends of the first metal separator 30 and the second metal separator 32 are joined together by welding, brazing, crimpling, etc. to form a joint separator 33.

The resin frame equipped MEA 28 includes a membrane electrode assembly 28a (hereinafter referred to as the "MEA 28a") and a resin frame member 46 joined to the outer end of the MEA 28a, and provided around the outer end of the MEA 28a. The MEA 28a includes an electrolyte membrane 40, an anode (first electrode) 42 provided on one surface of the electrolyte membrane 40, and a cathode (second electrode) 44 provided on another surface of the electrolyte membrane 40.

For example, the electrolyte membrane 40 is a solid polymer electrolyte membrane (cation ion exchange membrane). The solid polymer electrolyte membrane is a thin membrane of perfluorosulfonic acid containing water, for example. The electrolyte membrane 40 is interposed between the anode 42 and the cathode 44. A fluorine based electrolyte may be used as the electrolyte membrane 40. Alternatively, an HC (hydrocarbon) based electrolyte may be used as the electrolyte membrane 40.

Though not shown, the anode 42 includes a first electrode catalyst layer joined to one surface of the electrolyte membrane 40 and a first gas diffusion layer stacked on the first electrode catalyst layer. The cathode 44 includes a second electrode catalyst layer joined to another surface of the electrolyte membrane 40 and a second gas diffusion layer stacked on the second electrode catalyst layer.

At one end of the power generation cell 12 in the longitudinal direction indicated by an arrow B (horizontal direction in FIG. 2), an oxygen-containing gas supply passage 34a, a plurality of coolant discharge passages 36b, and a plurality of (e.g., two as in the case of the present invention) fuel gas discharge passages 38b (reactant gas discharge passages) are provided. The oxygen-containing gas supply passage 34a, the coolant discharge passages 36b, and the fuel gas discharge passages 38b extend through the power generation cell 12 in the stacking direction. The oxygen-containing gas supply passage 34a, the coolant discharge passages 36b, and the fuel gas discharge passages 38b pass through the stack body 14, the insulator 18a, and the end plate 20a in the stacking direction (the oxygen-containing gas supply passage 34a, the coolant discharge passages 36b, and the fuel gas discharge passages 38b may pass through the terminal plate 16a). These passages are arranged in the vertical direction. A fuel gas such as a hydrogen-containing gas as one of the reactant gases is discharged through the fuel gas discharge passages 38b. An oxygen-containing gas as another of the reactant gases is supplied through the oxygen-containing gas supply passage 34a. The coolant is discharged through the coolant discharge passages 36b.

The oxygen-containing gas supply passage 34a is positioned between the two coolant discharge passages 36b provided separately at upper and lower positions. The plurality of fuel gas discharge passages 38b includes an upper fuel gas discharge passage 38b1 and a lower fuel gas discharge passage 38b2. The upper fuel gas discharge passage 38b1 is positioned above the upper coolant discharge passage 36b. The lower fuel gas discharge passage 38b2 is positioned below the lower coolant discharge passage 36b.

At another end of the power generation cell 12 in the direction indicated by the arrow B, a fuel gas supply passage 38a, a plurality of coolant supply passages 36a, and a plurality of (e.g., two as in the case of the embodiment of the present invention) oxygen-containing gas discharge passages 34b (reactant gas discharge passages) are provided. The fuel gas supply passage 38a, the coolant supply passages 36a, and the oxygen-containing gas discharge passages 34b extend through the power generation cell 12 in the stacking direction. The fuel gas supply passage 38a, the coolant supply passages 36a, and the oxygen-containing gas discharge passages 34b pass through the stack body 14, the insulator 18a, and the end plate 20a in the stacking direction (the fuel gas supply passage 38a, the coolant supply passages 36a, and the oxygen-containing gas discharge passages 34b may pass through the terminal plate 16a). These passages are arranged in the vertical direction. The fuel gas is supplied through the fuel gas supply passage 38a. The coolant is supplied through the coolant supply passages 36a. The oxygen-containing gas is discharged through the oxygen-containing gas discharge passages 34b. The layout of the oxygen-containing gas supply passage 34a, the oxygen-containing gas discharge passages 34b, the fuel gas supply passage 38a, and the fuel gas discharge passages 38b is not limited to the above embodiment, and may be changed depending on the required specification.

The fuel gas supply passage 38a is positioned between the two coolant supply passages 36a provided separately at upper and lower positions. The plurality of oxygen-containing gas discharge passages 34b include an upper oxygen-containing gas discharge passage 34b1 and a lower oxygen-containing gas discharge passage 34b2. The upper oxygen-containing gas discharge passage 34b1 is positioned above the upper coolant supply passage 36a. The lower oxygen-containing gas discharge passage 34b2 is positioned below the lower coolant supply passage 36a.

As shown in FIG. 1, the oxygen-containing gas supply passage 34a, the coolant supply passages 36a, and the fuel gas supply passage 38a are connected to inlets 35a, 37a, 39a provided at the end plate 20a. Further, the oxygen-containing gas discharge passages 34b, the coolant discharge passages 36b, and the fuel gas discharge passages 38b are connected to outlets 35b, 37b, 39b provided at the end plate 20a.

As shown in FIG. 2, at one end of the resin frame member 46 in the direction indicated by the arrow B, the oxygen-containing gas supply passage 34a, the plurality of coolant discharge passages 36b, and the plurality of fuel gas discharge passages 38b are provided. At the other end of the resin frame member 46 in the direction indicated by the arrow B, the fuel gas supply passage 38a, the plurality of coolant supply passages 36a, and the plurality of oxygen-containing gas discharge passages 34b are provided.

The electrolyte membrane 40 may protrude outward without using the resin frame member 46. Further, a frame shaped film which protrudes outward may be provided on both sides of the electrolyte membrane 40.

Figure 3:
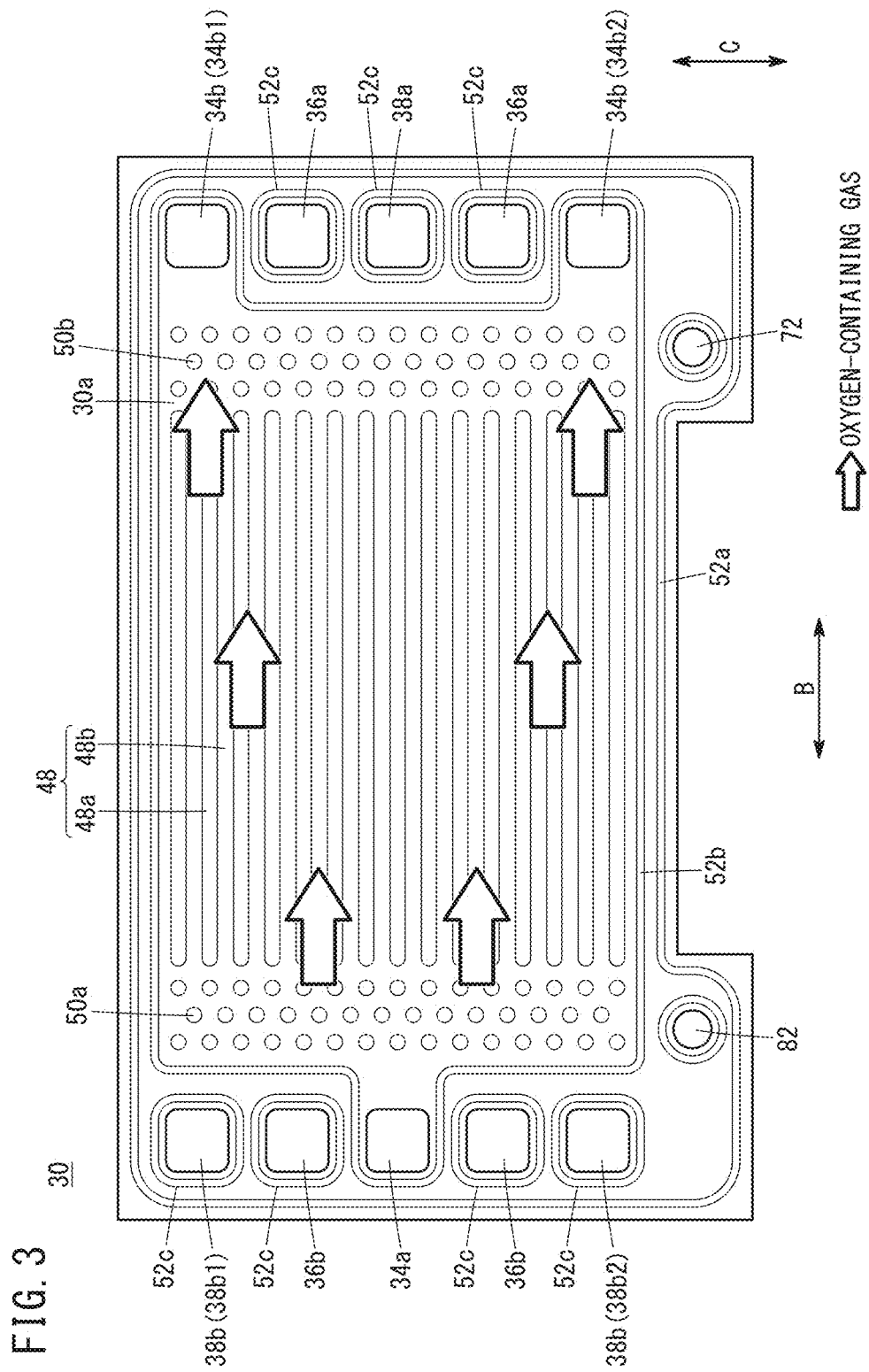
FIG. 3 is a view showing structure of a first metal separator as viewed from an oxygen-containing gas flow field.

As shown in FIG. 3, the first metal separator 30 has an oxygen-containing gas flow field 48 on its surface 30a facing the resin frame equipped MEA 28. For example, the oxygen-containing gas flow field extends in the direction indicated by the arrow B. The oxygen-containing gas flow field 48 is connected to (in fluid communication with) the oxygen-containing gas supply passage 34a and the oxygen-containing gas discharge passages 34b. The oxygen-containing gas flow field 48 includes straight flow grooves (or wavy flow grooves) 48b between a plurality of ridges 48a extending in the direction indicated by the arrow B.

An inlet buffer 50a is provided between the oxygen-containing gas supply passage 34a and the oxygen-containing gas flow field 48. A plurality of bosses are formed in the inlet buffer 50a by press forming. An outlet buffer 50b is provided between the oxygen-containing gas discharge passages 34b and the oxygen-containing gas flow field 48 by press forming. A plurality of bosses are formed in the outlet buffer 50b.

A plurality of metal bead seals are formed on the surface 30a of the first metal separator 30 by press forming. The metal bead seals are expanded toward the resin frame equipped MEA 28. Instead of the metal bead seal, a ridge shaped elastic seal made of elastic material may be provided. The plurality of metal bead seals include an outer bead 52a, an inner bead 52b, and a plurality of passage beads 52c. The outer bead 52a is provided along the outer end of the surface 30a. The inner bead 52b is provided around the oxygen-containing gas flow field 48, the oxygen-containing gas supply passage 34a, and the oxygen-containing gas discharge passages 34b, while allowing the oxygen-containing gas flow field 48 to be connected to the oxygen-containing gas supply passage 34a and the oxygen-containing gas discharge passages 34b.

The plurality of passage beads 52c are formed around the fuel gas supply passage 38a, the fuel gas discharge passages 38b, the coolant supply passages 36a, and the coolant discharge passages 36b, respectively. The outer bead 52a may be provided as necessary, and the outer bead 52a may not be provided.

As shown in FIG. 2, the second metal separator 32 has a fuel gas flow field 58 on its surface 32a facing the resin frame equipped MEA 28. For example, the fuel gas flow field 58 extends in a direction indicated by an arrow B. The fuel gas flow field 58 is connected to (in fluid communication with) the fuel gas supply passage 38a and the fuel gas discharge passages 38b. The fuel gas flow field 58 includes a plurality of straight flow grooves (or wavy flow groves) 58b extending straight between a plurality of ridges 58a in the direction indicated by the arrow B.

An inlet buffer 60a is provided between the fuel gas supply passage 38a and the fuel gas flow field 58 by press forming. A plurality of bosses are formed in the inlet buffer 60a. An outlet buffer 60b is formed between the fuel gas discharge passages 38b and the fuel gas flow field 58 by press forming. A plurality of bosses are formed in the outlet buffer 60b.

A plurality of metal bead seals are formed on the surface 32a of the second metal separator 32 by press forming. The metal bead seals are expanded toward the resin frame equipped MEA 28. Instead of the metal bead seals, ridge shaped elastic seals made of elastic material may be provided. The plurality of metal bead seals include an outer bead 62a and an inner bead 62b, and a plurality of passage beads 62c. The outer bead 62a is provided along the outer end of the surface 32a. The inner bead 62b is provided inside the outer bead 62a, around the fuel gas flow field 58, the fuel gas supply passage 38a, and the fuel gas discharge passages 38b, while allowing the fuel gas flow field 58 to be connected to the fuel gas supply passage 38a and the fuel gas discharge passages 38b.

The plurality of passage beads 62c are formed around the oxygen-containing gas supply passage 34a, the oxygen-containing gas discharge passages 34b, the coolant supply passages 36a, and the coolant discharge passages 36b, respectively. The outer bead 62a may be provided as necessary, and the outer bead 62a may not be provided.

A coolant flow field 66 is formed between a surface 30b of the first metal separator 30 and a surface 32a of the second metal separator 32 that are joined together by welding or by brazing. The coolant flow field 66 is connected to (in fluid communication with) the coolant supply passages 36a and the coolant discharge passages 36b. The coolant flow field 66 is formed by stacking a surface of the first metal separator 30 on the back of the oxygen-containing gas flow field 48 and a surface of the second metal separator 32 on the back of the fuel gas flow field 58.

Figure 4:
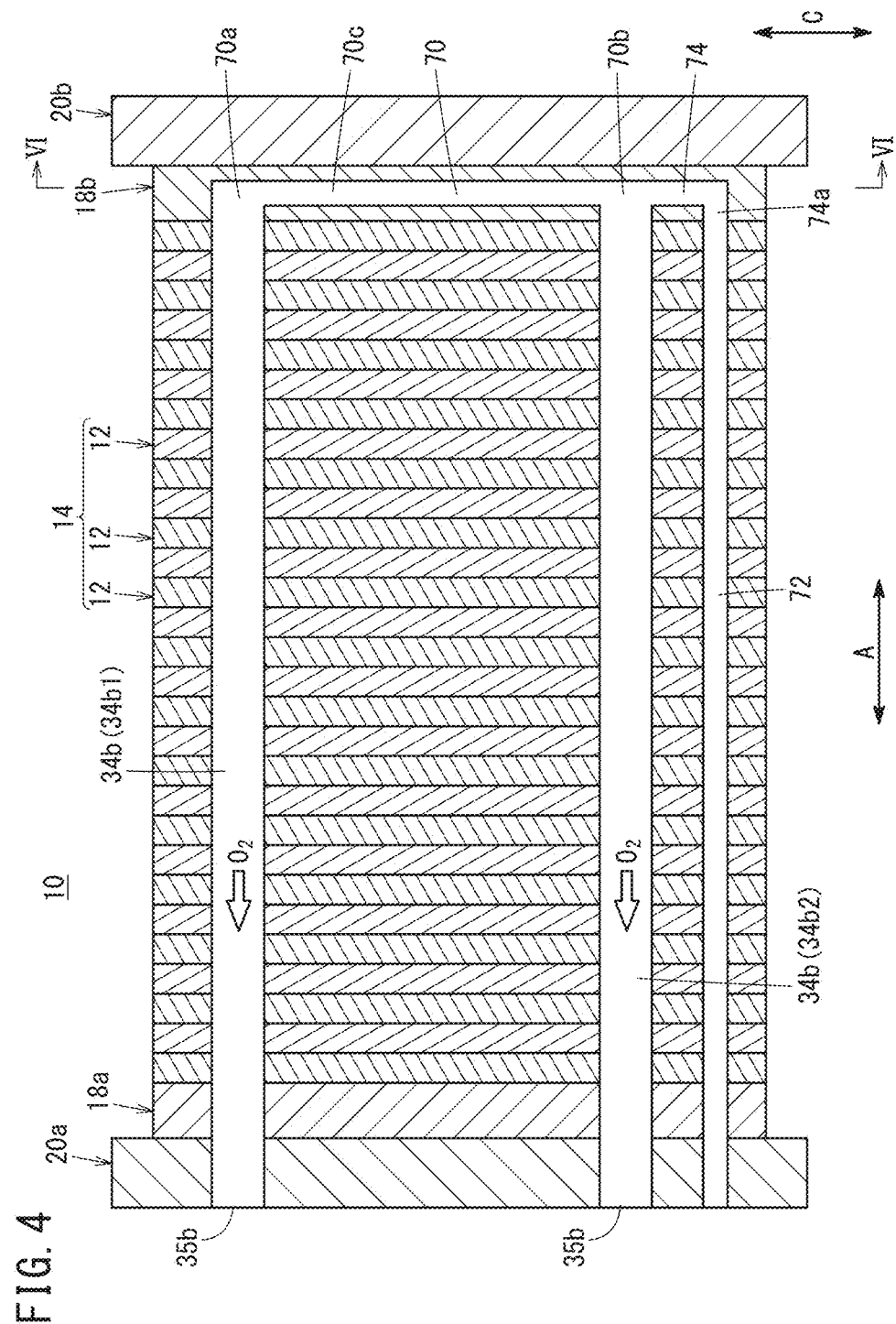
FIG. 4 is a cross sectional view schematically showing the fuel cell stack, in a surface including a plurality of oxygen-containing gas discharge passages.

As shown in FIG. 4, the upper oxygen-containing gas discharge passage 34b1 and the lower oxygen-containing gas discharge passage 34b2 are connected together by a first connection channel 70, at ends (deep ends) opposite to the outlets 35b. In FIG. 4, for ease of understanding, the fuel gas supply passage 38a, and the coolant supply passages 36a (FIG. 2) are not illustrated. In the embodiment of the present invention, the first connection channel 70 is provided in the insulator 18b.

Specifically, the first connection channel 70 is extends in the vertical direction in the insulator 18b. The first connection channel 70 includes a first upper passage connection part 70a adjacent to the upper oxygen-containing gas discharge passage 34b1, a first lower passage connection part 70b adjacent to the lower oxygen-containing gas discharge passage 34b2, and a first intermediate part 70c connecting the first upper passage connection part 70a and the first lower passage connection part 70b. As shown in FIG. 6, the channel width of the first intermediate part 70c (channel width in the direction indicated by the arrow B) is smaller than the channel width of each of the first upper passage connection part 70a and the first lower passage connection part 70b. It should be noted that the channel width of the first intermediate part 70c may be the same as or larger than the channel width of each of the first upper passage connection part 70a and the first lower passage connection part 70b.

In the embodiment of the present invention, the first connection channel 70 may be provided in the terminal plate 16b or the end plate 20b. Alternatively, the first connection channel 70 may be provided in a connection channel member provided outside the insulator 18b and the end plate 20b.

As shown in FIG. 4, a first drain 72 is provided in the fuel cell stack 10, for discharging water W (see FIG. 7) produced at the cathode in the fuel cell stack 10 during operation. A seal 72a (see FIG. 2) is provided around the first drain 72. The first drain 72 passes through the fuel cell stack 10 in the stacking direction indicated by the arrow A, and the first drain 72 is connected to the first connection channel 70. The first drain 72 is provided below the lowermost position of the lower oxygen-containing gas discharge passage 34b2.

A first relay channel 74 is provided for the fuel cell stack 10. The first relay channel 74 is connected to (in fluid communication with) the first connection channel 70 and the first drain 72. The first relay channel 74 includes a first drain connection part 74a adjacent to the first drain 72. In the embodiment of the present invention, the first relay channel 74 is provided in the insulator 18b. In the case where the first connection channel 70 is provided in the end plate 20b, preferably, the first relay channel 74 is provided in the end plate 20b as well. The first connection channel 70 and the first relay channel 74 may be provided in the insulator 18b and the end plate 20b separately.

As shown in FIG. 3, the first drain 72 is provided inside the lower oxygen-containing gas discharge passage 34b2 in the horizontal direction perpendicular to the stacking direction (in the direction indicated by the arrow B). As shown in FIG. 6, the first relay channel 74 is connected to the lowermost position of the first connection channel 70, and inclined downward from the first connection channel 70 toward the first drain 72.

Figure 5:
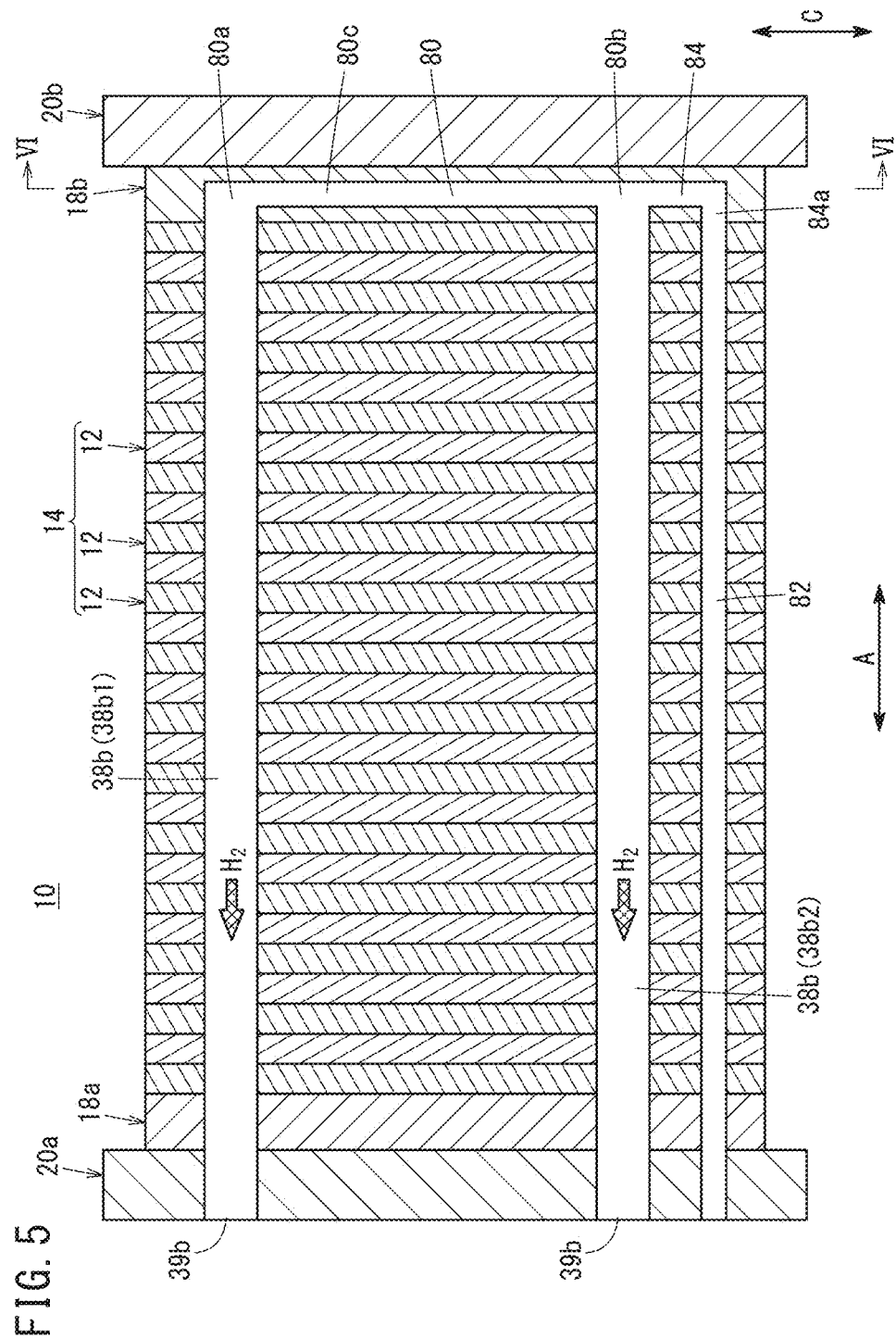
FIG. 5 is a cross sectional view schematically showing the fuel cell stack, in a surface including a plurality of fuel gas discharge passages.

As shown in FIG. 5, the upper fuel gas discharge passage 38b1 and the lower fuel gas discharge passage 38b2 are connected together by a second connection channel 80 at the ends (deep ends) opposite to the outlets 39b. In FIG. 5, for ease of understanding, the oxygen-containing gas supply passage 34a and the coolant discharge passages 36b are not illustrated. In the embodiment of the present invention, the second connection channel 80 is provided in the insulator 18b.

Specifically, the second connection channel 80 extends in the vertical direction in the insulator 18b. The second connection channel 80 includes a second upper passage connection part 80a adjacent to the upper fuel gas discharge passage 38b1, a second lower passage connection part 80b adjacent to the lower fuel gas discharge passage 38b2, and a second intermediate part 80c connecting the second upper passage connection part 80a and the second lower passage connection part 80b. As shown in FIG. 6, the channel width of the second intermediate part 80c (channel width in the direction indicated by the arrow B) is smaller than the channel width of each of the second upper passage connection part 80a and the second lower passage connection part 80b. It should be noted that the channel width of the second intermediate part 80c may be the same as or larger than the channel width of each of the second upper passage connection part 80a and the second lower passage connection part 80b.

Unlike the embodiment of the present invention, the second connection channel 80 may be provided in the terminal plate 16b or the end plate 20b. Alternatively, the second connection channel 80 may be provided in a connection channel member provided outside the insulator 18b and the end plate 20b.

As shown in FIG. 5, a second drain 82 is provided in the fuel cell stack 10, for discharging water W (see FIG. 7) produced at the anode in the fuel cell stack 10 during operation (power generation) of the fuel cell stack 10. A seal 82a (see FIG. 2) is provided around the second drain 82. The second drain 82 passes through the fuel cell stack 10 in the stacking direction indicated by the arrow A, and the second drain 82 is connected to the second connection channel 80. The second drain 82 is provided below the lowermost position of the lower fuel gas discharge passage 38b2.

A second relay channel 84 is provided for the fuel cell stack 10. The second relay channel 84 is connected to (in fluid communication with) the second connection channel 80 and the second drain 82. The second relay channel 84 includes a second drain connection part 84a adjacent to the second drain 82. In the embodiment of the present invention, the second relay channel 84 is provided in the insulator 18b. In the case where the second connection channel 80 is provided in the end plate 20b, preferably, the second relay channel 84 is provided in the end plate 20b as well. The second connection channel 80 and the second relay channel 84 may be provided in the insulator 18b and the end plate 20b separately.

As shown in FIG. 2, the second drain 82 is provided inside the lower fuel gas discharge passage 38b2 in the horizontal direction perpendicular to the stacking direction (in the direction indicated by the arrow B). As shown in FIG. 6, the second relay channel 84 is connected to the lowermost position of the second connection channel 80, and inclined downward from the second connection channel 80 toward the second drain 82.

It should be noted that only one of the first connection channel 70 and the second connection channel 80 may be provided, and only one of the first drain 72 and the second drain 82 may be provided.

Operation of the fuel cell stack 10 having above structure will be described below.

Firstly, as shown in FIG. 1, an oxygen-containing gas such as air is supplied to the oxygen-containing gas supply passage 34a (inlet 35a) of the end plate 20a. A fuel gas such as a hydrogen-containing gas is supplied to the fuel gas supply passage 38a (inlet 39a) of the end plate 20a. Coolant such as pure water, ethylene glycol, oil is supplied to the coolant supply passages 36a (inlets 37a) of the end plate 20a.

As shown in FIG. 3, the oxygen-containing gas flows from the oxygen-containing gas supply passage 34a into the oxygen-containing gas flow field 48 of the first metal separator 30. The oxygen-containing gas flows along the oxygen-containing gas flow field 48 in the direction indicated by the arrow B, and the oxygen-containing gas is supplied to the cathode 44 of the MEA 28a.

In the meanwhile, as shown in FIG. 2, the fuel gas is supplied from the fuel gas supply passage 38a to the fuel gas flow field 58 of the second metal separator 32. The fuel gas flows along the fuel gas flow field 58 in the direction indicated by the arrow B, and the fuel gas is supplied to the anode 42 of the MEA 28a.

Thus, in each MEA 28a, the oxygen-containing gas supplied to the cathode 44 and the fuel gas supplied to the anode 42 are partially consumed in the electrochemical reactions in the second electrode catalyst layer and the first electrode catalyst layer to generate electricity.

Then, the oxygen-containing gas supplied to, and partially consumed at the cathode 44 flows along the oxygen-containing gas discharge passages 34b in the direction indicated by the arrow A. Likewise, the fuel gas supplied to, and partially consumed at the anode 42 flows along the fuel gas discharge passage 38b in the direction indicated by the arrow A.

Further, the coolant supplied to the coolant supply passages 36a flows into the coolant flow field 66 between the first metal separator 30 and the second metal separator 32. Thereafter, the coolant flows in the direction indicated by the arrow B. After the coolant cools the MEA 28a, the coolant is discharged from the coolant discharge passages 36b.

In this case, in the fuel cell stack 10 according to the embodiment of the present invention, the following advantages are obtained.

In the fuel cell stack 10, the plurality of oxygen-containing gas discharge passages 34b having different heights are formed, and the oxygen-containing gas discharge passages 34b are connected together by the first connection channel 70 (see FIG. 4). Further, the plurality of fuel gas discharge passages 38b having different heights are formed, and the fuel gas discharge passages 38b are connected together by the second connection channel 80 (see FIG. 5).

Therefore, as shown in FIG. 7, when the fuel cell stack 10 is tilted from the horizontal surface S, (e.g., when the vehicle quipped with the fuel cell stack 10 is tilted), the produced water W flows from the upper oxygen-containing gas discharge passage 34b1 to the first drain 72 through the first connection channel 70. Further, the produced water W flows from the lower oxygen-containing gas discharge passage 34b2 to the first drain 72. Further, when the produce water W exceeding the volume of the first drain 72 flows into the first drain 72, the produced water W is discharged from an outlet 73 of the first drain 72.

Though not shown in detail, also in the flow channel at the anode (FIG. 5), when the fuel cell stack 10 is tilted, the produced water W flows from the upper fuel gas discharge passage 38b1 to the second drain 82 through the second connection channel 80. Further, the produced water W flows from the lower fuel gas discharge passage 38b2 to the second drain 82. Then, when the produced water W which exceeds the volume of the second drain 82 flows into the second drain 82, the produced water W is discharged from an outlet 83 of the second drain 82 (see FIG. 1).

Therefore, when the fuel cell stack 10 is inclined, it is possible to reduce the quantity of the produced water W (stagnant water) retained at the end of the stack body 14 (reactant gas discharge passage), or prevent the produced water W (stagnant water) from being retained at the end of the stack body 14 (reactant gas discharge passage). Accordingly, it is possible to improve the stability of power generation in the fuel cell stack 10. Further, since the quantity of the stagnant water is reduced, or no stagnant water is produced in the fuel cell stack 10, it is possible to extend the product life of at least one of the electrolyte membrane 40, the electrode catalyst, and the separator.

The first drain 72 and the second drain 82 are provided for the fuel cell stack 10, for discharging the produced water W. Further, the first drain 72 and the second drain 82 pass through the fuel cell stack 10 in the stacking direction, and the first drain 72 and the second drain 82 are connected to the first connection channel 70 and the second connection channel 80. In the structure, since discharge of the produced water W is facilitated through the first drain 72 and the second drain 82, it becomes possible to effectively reduce the quantity of stagnant water, or prevent production of stagnant water.

The first connection channel 70 and the second connection channel 80 are provided in the insulator 18b and the end plate 20b positioned at the end of the stack body 14. With the simple and economical structure, it is possible to provide the first connection channel 70 and the second connection channel 80.

The plurality of oxygen-containing gas discharge passages 34b include the upper oxygen-containing gas discharge passage 34b1 and the lower oxygen-containing gas discharge passage 34b2 having different heights. Further, the plurality of fuel gas discharge passages 38b include the upper fuel gas discharge passage 38b1 and the lower fuel gas discharge passage 38b2 having different heights. Further, the first drain 72 and the second drain 82 are positioned below the lower oxygen-containing gas discharge passage 34b2 and the lower fuel gas discharge passage 38b2, respectively. In the structure, under the effect of the gravity, it is possible to facilitate discharge of the produced water W to a greater extent.

The embodiment of the present invention adopts cell-by-cell cooling structure where each of cell units is formed by sandwiching a membrane electrode assembly between two metal separators, and a coolant flow field is formed between the adjacent unit cells. It may be possible to adopt skip cooling structure where each of cell units includes three or more metal separators and two or more membrane electrode assemblies, the cell unit is formed by stacking the metal separators and the membrane electrode assemblies alternately, and a coolant flow field is formed between the adjacent unit cells.

Alternatively, it may adopt structure where the first connection channel 70 and the second connection channel 80 are provided, but the first drain 72 and the second drain 82 are not provided. Even in the case where the first drain 72 and the second drain 82 are not provided, when the fuel cell stack 10 is tilted, the produced water W flows from the upper oxygen-containing gas discharge passage 34b1 to the lower oxygen-containing gas discharge passage 34b2 through the first connection channel 70, and flows from the upper fuel gas discharge passage 38b1 to the lower fuel gas discharge passage 38b2 through the second connection channel 80. Thus, in comparison with the case where the first connection channel 70 and the second connection channel 80 are not provided, it is possible to reduce the quantity of produced stagnant water retained at the deep ends of the upper oxygen-containing gas discharge passage 34b1 and the upper fuel gas discharge passage 38b1 to a greater extent. It may be possible to adopt structure where the first drain 72 and the second drain 82 are not provided, and the produced water W is discharged to the outside directly from the deep end of each of the discharge passages.

The present invention is not limited to the above described embodiment. Various modification may be made without deviating from the gist of the present invention.

What is claimed is:

1. A fuel cell stack, comprising:
a stack body including a plurality of power generation cells stacked in a horizontal direction, the power generation cells each comprising a membrane electrode assembly and a separator stacked on the membrane electrode assembly, the membrane electrode assembly including an electrolyte membrane and electrodes provided on both sides of the electrolyte membrane;
a first reactant gas flow field being formed in the fuel cell stack and configured to allow a first reactant gas to flow along a first electrode surface; and
a second reactant gas flow field being formed in the fuel cell stack and configured to allow a second reactant gas to flow along a second electrode surface, wherein
in the stack body, a plurality of first reactant gas discharge passages are connected to the first reactant gas flow field and configured to discharge the first reactant gas, and the first reactant gas discharge passages pass through the fuel cell stack in a stacking direction of the power generation cells;
in the stack body, a plurality of second reactant gas discharge passages are connected to the second reactant gas flow field and configured to discharge the second reactant gas, and the second reactant gas discharge passages pass through the fuel cell stack in the stacking direction of the power generation cells;
each of the plurality of first reactant gas discharge passages formed in the stack body has a separate and distinct outlet of the first reactant gas;
each of the plurality of second reactant gas discharge passages formed in the stack body has a separate and distinct outlet of the second reactant gas;
the plurality of first reactant gas discharge passages or the plurality of second reactant gas discharge passages include an upper reactant gas discharge passage and a lower reactant gas discharge passage;
a drain positioned below the lower reactant gas discharge passage; and
the upper reactant gas discharge passage and the lower reactant gas discharge passage are connected together by a connection channel at ends opposite to the outlets of the plurality of first reactant gas discharge passages or the plurality of second reactant gas discharge passages.

2. The fuel cell stack according to claim 1, wherein the drain is configured to discharge produced water, and
wherein the drain passes through the fuel cell stack in the stacking direction, and the drain is connected to the connection channel.

3. The fuel cell stack according to claim 2, wherein each of the power generation cells further includes a resin frame member;
the resin frame member is joined to an outer peripheral portion of the membrane electrode assembly;
and the drain passes through the resin frame member and the separator.

4. The fuel cell stack according to claim 3, wherein the separator includes a seal configured to tightly contact the resin frame member around the drain.

5. The fuel cell stack according to claim 4, wherein the seal is a bead seal protrudes toward the resin frame member.

6. The fuel cell stack according to claim 1, wherein the connection channel is provided in a terminal plate, an insulator, or an end plate positioned at an end of the stack body.

7. The fuel cell stack according to claim 1, further comprising a relay channel inclined downward from a lower end of the connection channel,
wherein the drain is connected to the connection channel through the relay channel.

8. The fuel cell stack according to claim 1, comprising an oxygen-containing gas flow field as the first reactant gas flow field and a fuel gas flow field as the second reactant gas flow field,
wherein the plurality of the first reactant gas discharge passages are a plurality of oxygen-containing gas discharge passages and the plurality of second reactant gas discharge passages are a plurality of fuel gas discharge passages;
the connection channel includes a first connection channel connected to the plurality of oxygen-containing gas discharge passages and a second connection channel connected to the plurality of fuel gas discharge passages;
the stack body further includes a first drain and a second drain;
the first drain passes through the fuel cell stack in the stacking direction below the plurality of oxygen-containing gas discharge passages, and the first drain is connected to the first connection channel; and
the second drain passes through the fuel cell stack in the stacking direction below the plurality of fuel gas discharge passages, and the second drain is connected to the second connection channel.

9. The fuel cell stack according to claim 8 wherein the first drain and the second drain are positioned below the oxygen-containing gas flow field and the fuel gas flow field.

* * * * *